3,217,392
HEAT EXCHANGER ELEMENTS
Franciscus Roffelsen, 7 Mauritslaan,
Helmond, Netherlands
Filed May 18, 1962, Ser. No. 195,762
Claims priority, application Germany, July 18, 1961,
R 30,773
3 Claims. (Cl. 29—157.3)

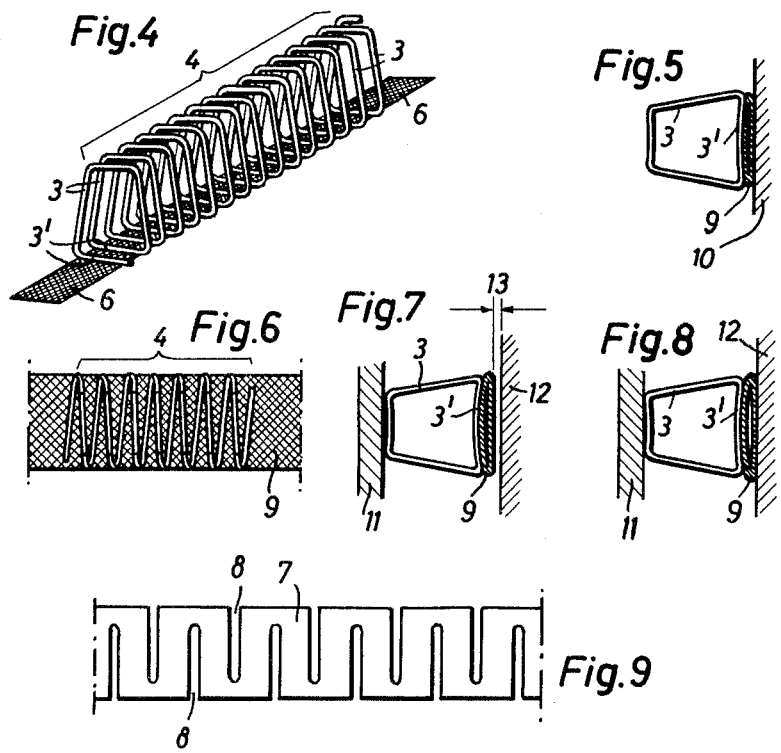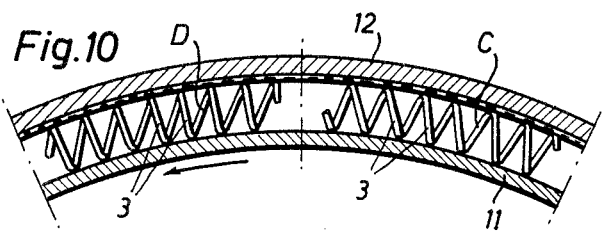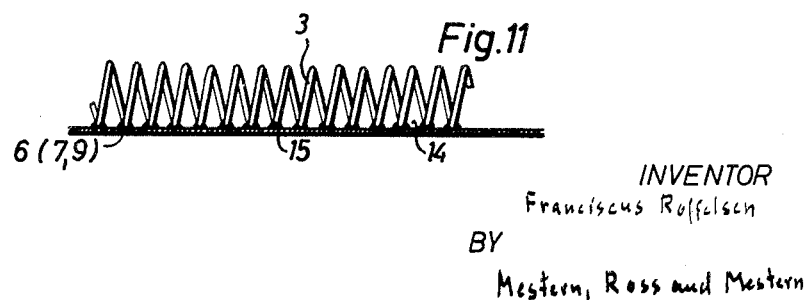

This invention relates to heat-exchange elements which are made up of a heat-conducting tube (usually of metal) and of a wire spiral or helix applied helically to a tubular surface of the tube, the invention being concerned in particular with the way in which the helix is fastened to the tubular surface with the aid of solder. The invention includes both a method of making such an element, the element so made, a unit which facilitates the manufacture of the element and which includes the wire helix, and a method of making such a unit.

In a method of manufacturing a heat-exchange element according to the invention, a wire helix having concavely arcuate parts in the wire turns and a strip consisting of or containing solder are applied helically to a tubular surface of a heat conducting tube with the strip between the wire helix and the tubular surface, and heat is applied to fuse the solder to fasten the wire helix to the surface through the concavely arcuate parts of the wire turns. By having the solder of the strip between the wire helix and the tubular surface, and by employing concavely arcuate parts to fasten the wire helix to the surface a number of advantages are obtained. In the first place the concavely arcuate parts of the wire turns define between the turns and the strip a space which is relatively thick along its helical centre line but relatively thin along its two helical edges, where the concavely arcuate parts lie adjacent or even in contact with the strip. The narrow gaps at the edges of this space exert such a capillary effect upon the solder during the heating operation that the solder is held in the space referred to and after cooling establishes an intimate metallic connection of comparatively large area between the helix on the one hand and the tubular surface on the other. Thus a good heat transfer between the tube and the wire helix may be obtained. In the second place the liquid solder is retained between the helix and the tube and is unable to flow away onto those parts of the tube surface which are not covered by the helix. The tube is, therefore, hardened by the solder only along the line of the helical path defined by the centre line of the wire helix, the tubular surface remaining free from solder along the helical line which runs between the different turns of the helical path referred to. The tube thus retains to a considerable degree its original flexibility and it may, therefore, be bent to comparatively small radii without collapsing in the process, an advantage which is difficult or impossible to obtain if the whole of the tubular surface is covered with solder, a state of affairs which is liable to be produced if the solder is applied not between the helix and the surface but along the helical path which lies between the helical path defined by the centre line of the wire helix.

The strip may consist of solder and such a strip may, prior to its application to the tube, have notches formed on at least one of the surfaces which engage the tubular surface and the wire helix after application of the latter. Such notches may be provided with generous quantities of flux before the strip is applied to the tube.

The tube need not, however, consist of solder but may be in the form of a flexible metallic support which contains solder. Preferably the helix and the support are fastened together, for example by soldering or welding, through the concavely arcuate parts to make up a unit prior to application to the tubular surface. Such a unit can be more easily and quickly applied helically to the tubular surface than the simple wire helix itself which is able to yield in all directions and which stretches even under a slight tension. Once the helix connected to the flexible metallic support has been applied helically to the tubular surface all that is necessary is to solder the support to the tubular surface by the application of heat. During such application, any solder employed to secure the wire helix to the support is held in position beneath the concavely arcuate parts in just the same way as when the strip employed is made wholly of solder. In order to solder the support to the tubular surface a solder strip may be inserted between the support and this surface. As an alternative, the support may be coated with solder on the face remote from the helix and adjacent the tubular surface. It is preferred, however, to distribute the solder not continuously along the length of the support but instead to provide the support with recesses or perforations or other cavities which are then provided with solder. In this way it is possible to dispense with a solder strip or a continuous layer of solder on the support and there is then no danger that the wire helix will, so to speak, "float" on a layer of liquid solder during the soldering operation and slide on the layer out of its desired position. Furthermore one avoids a continuous intermediate layer of solidified solder between the tubular surface and the support and this provides an improved heat transfer between the tube and the helix.

One example of a suitable support is one in the form of a metal strip in which the recesses are in the form of open ended slots extending alternately from opposite sides of the metal strip to beyond its centre, these slots serving to accommodate an adequate supply of solder. The support strip may, if desired, be stretched or compressed longitudinally (depending on whether the tubular surface referred to is the outer or the inner surface of the tube) prior to the solder connecting the helix to the support being allowed to cool. For example the support may be stretched in the longitudinal direction either before connection to the helix or as an alternative after connection to the helix, but before introduction of the solder into the recesses. When the solder is allowed to cool down, the solidified solder maintains this stress in the support, and the stress is released only when the solder softens on heating the solder after application of the unit to the tubular surface referred to. This ensures that the support, which is of course wound cold onto the tube, shortens or lengthens (according to whether the support is wound on the exterior or interior surface of the tube) after the solder is heated and thus becomes applied extremely intimately to the tubular surface. Shifting of the wire helix out of its allotted position on the tubular surface during the soldering operation may also be avoided.

The support may as an alternative be in the form of a strip of wire fabric or wire braid (in both of which the wires are interlaced) having the wire threads running obliquely to the strip edge, the fabric or braid being impregnated with solder. The solder may be applied, for example, by dipping the support into a liquid solder bath. Such a support is able to yield in the longitudinal direction by an amount which depends upon the hardness or softness of the wire employed. The strip may, if desired, be in the form of a flattened hose. Such a form of strip is particularly useful when the unit is to be applied to the interior tubular surface of the tube or to any other concavely arcuate surface since the hose tends to resume its normal or expanded round configuration when the solder is fused and thus tends to come into firm engagement with the surface. This effect can be improved by shortening or compressing the hose in a longitudinal direction during the formation of the unit so that when finally heat is applied after the application of the unit to the concave surface the hose tends not only to resume its former round configuration but also tends to expand in a longitudinal direction.

When the unit is to be secured to a concave surface, the helix must be sufficiently expanded or stretched before connection to the support for the individual turns of the wire to be at such an interval as to permit not merely shortening of the support but also the bending of the helix with the externally located support reinforced by the solder and hence non-expansible, to the radius required in each case.

The invention will now be described in further detail with reference to the accompanying drawings in which:

FIGURE 1 is an elevation of a heat exchanger element during the course of its manufacture;

FIGURE 2 is an axial longitudinal section through part of this element;

FIGURE 3 is an enlarged partial cross-section along the lines II—III of FIGURES 1 and 2; and FIGURES 4 to 11 show various units and parts thereof.

Referring first of all to FIGURE 1, a metal tube 1 has a solder strip 2 wound onto a part of its external tubular surface, and a wire helix 4 a few of whose wire turns are shown at 3 is applied helically to the tube 1 over the strip 2. It will be appreciated that the turns 3 themselves extend around the central axis of the helix 4, and that this axis itself passes in a helical manner around the axis of the tube 1.

The tube 1 is rotated about its own axis and is moved from right to left past a source of heat (not shown) whilst the strip 2 and over it the helix 4 having the wire turns 3 are wound and continuously fed to the tube 1.

As can be seen from FIGURE 2, each turn 3 has a concavely arcuate part 3' and the strip 2, prior to being heated, lies between the concavely arcuate part 3' and the tubular surface of the tube 1. The strip 2 is of substantially the same width as the turns 3 so that the turns 3 res upon the solder strip 2 only at the ends of the parts 3'. The strip 2 is provided on its side remote from the wire helix 4 with notches 5 which are filled with flux which the strip has picked up from a flux bath through which is has previously travelled.

As the tube 1 provided with a solder strip 2 and wire helix 4 becomes heated to a greater degree, the solder softens and the wire turns 3, by the tensile stress previously imparted to the helix 4, sink increasingly into the fused solder, until the ends of their concavely arcuate portions 3' make contact against the surface of the tube 1. The parts 3' gradually become almost completely surrounded by solder. This occurs because the narrow gap between the parts 3' and the solder strip 2 suck in liquid solder by capillary action, even from neighboring parts of the solder strip.

As a result of the same capillary action, the solder which has penetrated into the gaps is also retained there and prevented from running out not only laterally but also from what happens at any time to be the upper part of the tube 1 to the lower part. On the contrary, during the continuous further rotation of the tube 1, only surplus solder flows within the helical path which extends round the tube 1 and thus reaches any points which may not yet have been sufficiently supplied with solder, where it is then retained by surface adhesion or capillary action.

The concave arching of the parts 3' facing the tube also brings about accurate fitting of the convolutions 3 upon the tube 1 and accurate alignment of the parts among themselves.

Referring now to FIGURE 4, the wire helix 4 is secured or attached to a wire fabric strip 6 by soldering or welding of the concavely curved parts 3' of its wire turns 3. The support strip 6, the wire threads of which run obliquely to the strip edges, is slightly prestressed in the longitudinal direction like the wire spiral 4, and is fixed in that position by solder introduced into the strip 6. This spiral is excellently suited for fastening on convexly curved surfaces, e.g., on the external surface of tubes. When the support strip 6 resting on the convex surface is heated, the support strip 6 and the wire helix 4 pull towards one another, so that the strip 6 is applied intimately to the convex surface and the helix 4 presses upon the external surface of the strip 6. Simultaneously, the solder present in the strip 6 which has become liquid on being heated, firmly connects the strip 6, upon solidification, on the one hand to the convex surface and on the other hand to the wire turns of the wire spiral 4. The capillary action of the cavities in the strip 6 and of the gaps between the wire portions 3' and the strip 6 prevents solder from running onto parts of the convex surface which are not covered by the strip 6.

In FIGURE 9 is shown an alternative support strip in the form of a thin metal strip 7 having slot-like perforations 8 extending alternately from its two edges to beyond the centre of the strip. This strip 7 may be used instead of the wire fabric 6. By virtue of the recesses 8, it can be elastically expanded and contracted in the longitudinal direction. The perforations 8 also serve to accommodate an adequate supply of solder.

In the case of the wire helix 4, shown in cross-section in FIGURE 5, and in elevation in FIGURE 6, the support strip 9 consists of a flat-pressed hose of wire fabric or wire braid. In the contracted condition according to FIGURE 5 and FIGURE 7, the hose 9 is retained by solder introduced into the fabric or braid. If such a spiral is applied with the hose onto an uneven surface of a body 10 under light pressure and is heated, then the hose tends to approach its original round form, insofar as this is permitted by the uneven surface. In doing so, it becomes intimately applied to the said surface and after cooling of the solder forms a mechanically firm and good thermally conductive connection between the body 10 and the wire helix 4.

The wire helix according to FIGURE 5 and FIGURE 6 is also suitable for fastening in circulating convolutions on the inner surface of heat exchanger tubes.

If, as FIGURE 7 and FIGURE 8 show, a helix according to FIGURES 5 and 6 with outwardly orientated hose 9 is wound helically onto an auxiliary tube 11 of appropriate diameter and the auxiliary tube 11 with the helix is thrust into a heat exchanger tube 12 whose inner wall forms with the contracted hose a narrow gap 13 permitting the spiral to be thrust in, then after heating and softening of the solder present in the hose, the hose 9 will spring out until it makes close contact with the inner wall of the exchanger tube 12 all round. After the solder has solidified once more, the helix 4 is firmly connected to the exchanger tube via the hose 9. Thereafter, the auxiliary tube 11 may be removed by traction in the axial direction with simultaneous rotation in constant direction about its axis. For upon rotation of the auxiliary tube 11, the wire turns 3 which initially make contact therewith with a certain radial pressure yield resiliently, whereby the radial pressure is sufficiently reduced to enable the auxiliary tube 11 to be withdrawn without great effort and without damage to the wire helix. FIGURE 10 shows, on the righthand side at C the position of the turns 3 when the auxiliary tube 11 is stationary, and on the lefthand side at D when the auxiliary tube 11 rotates in the direction of the arrow.

The production of a structural unit which consists of a wire helix 4 secured upon a support strip 6, 7 or 9 is advantageously effected by winding helically around a convex cylindrical surface non-receptive to solder first the support (which may be prestressed in the longitudinal direction) then over the support a solder strip, and then over the latter the wire helix (which may likewise be prestressed) the whole then being heated to the fusion temperature of the solder strip. The cylinder having a surface non-receptive to solder may consist of a heat-resistant non-metallic substance, e.g., porcelain or glass, or of non-solderable metal such as cast iron or chromium. Upon heating, the liquid solder, encouraged by the capillary action of the cavities in the support strip and of the gap between the support strip and the wire helix, penetrates into the cavities and after cooling connects the helix and the support strip to one another. Since, if the quantity of solder contained in the solder strip is more or less correctly chosen, the surface of the support strip exhibits only an extremely thin coating of solder except at the points covered by the turns 3 of the wire helix 4, the support strip is adequately flexible even after solidification of the solder, so that it can easily be bent even to small radii.

FIGURE 11 shows, in side elevation, a wire spiral produced in the manner described and removed from the cylinder and stretched, having the accumulations of solder 15 at the base of the wire turns 3 and the solder-free points 14 of the strip surface between these wire turns 3.

I claim:

1. A method of manufacturing a heat-exchange element, comprising the steps of forming an elongated wire helix with a longitudinally extending attachment surface having a longitudinal recess to provide a multiplicity of turns each with an inwardly concave attachment stretch having a pair of protuberances defining between them a respective concavity; winding a substantially flat soldering strip helically about an elongated heat-conductive tube; winding said wire helix under longitudinal tension helically about said tube with said attachment surface overlying said strip and said protuberances of said turns resting upon said soldering strip so that said concavities of said turns define respective generally crescent-shaped capillary channels with said tube; and applying heat to said tube for melting said soldering strip to cause solder to flow into said channels, thereby securing said helix to said tube upon rehardening of said solder.

2. A method of manufacturing a heat-exchange element, comprising the steps of impregnating a tensioned elongated, flexible and longitudinally distendable metallic mesh with solder; disposing a stretched elongated wire helix, provided with a multiplicity of turns having respective attachment stretches over part of the circumference of the turns atop said mesh and applying heat to said mesh and helix for melting said solder and joining said helix and said mesh into an assembly with both said helix and said mesh in a stretched state; helically winding said assembly about an elongated heat-conductive tube; and concurrently longitudinally displacing said tube and said assembly applied thereto past a source of heat for remelting said solder and fastening said assembly to said tube whereby said helix and said mesh contract against said tube upon the remelting and are secured in the contracted state to said tube upon hardening of the solder.

3. A method of manufacturing a heat-exchange element, comprising the steps of superposing in contacting relationship an elongated flexible substantially flat longitudinally stretchable metallic mesh, a substantially flat strip of solder thereabove and an elongated wire helix provided with a substantially flat longitudinal attachment surface on its circumference to form an assembly; stretching said assembly and winding the stretched assembly helically about an arcuate surface unaffected by solder and applying heat for melting said solder and bonding said helix to said mesh upon rehardening of said solder to maintain the helix under longitudinal tension; sliding the helically wound assembly longitudinally over an elongated heat-conductive tube; and displacing said tube and the assembly carried thereon longitudinally past a source of heat for remelting said solder and permitting said helix to contract against said tube, thereby bonding said helix to said tube upon hardening of the solder.

References Cited by the Examiner

UNITED STATES PATENTS

| 625,642 | 5/1899 | Clarkson | 165—184 |
|---|---|---|---|
| 1,052,761 | 2/1913 | Steinwig | 113—110 |
| 1,512,295 | 10/1924 | Massey | 29—157.3 |
| 1,716,743 | 6/1929 | Still | 165—84 |
| 1,960,305 | 5/1934 | Emmons et al. | 165—184 |
| 2,196,186 | 4/1940 | Berg et al. | 165—184 |
| 2,268,680 | 6/1942 | Von Linde | 165—184 |
| 2,308,319 | 1/1943 | Stanton | 165—184 |
| 2,505,619 | 4/1950 | Holm | 29—157.5 |
| 2,588,500 | 3/1952 | Dugan | 29—157.5 |
| 2,595,457 | 5/1952 | Holm et al. | 165—166 |
| 2,697,588 | 12/1954 | Jensen | 165—166 |
| 2,731,245 | 1/1956 | McChesney | 29—157.3 |
| 2,872,730 | 2/1959 | Jones | 29—496 |
| 2,878,560 | 3/1959 | Gier | 29—455 |

FOREIGN PATENTS 742,490  12/1932  France.

ROBERT A. O'LEARY, *Primary Examiner.*

CHARLES SUKALO, *Examiner.*